United States Patent

Grolman

[15] 3,639,042
[45] Feb. 1, 1972

[54] APPARATUS FOR MEASURING THE ACUITY OF LOW-VISION PATIENTS

[72] Inventor: Bernard Grolman, Worcester, Mass.
[73] Assignee: American Optical Corporation, Southbridge, Mass.
[22] Filed: June 10, 1970
[21] Appl. No.: 45,190

[52] U.S. Cl. ............................................................351/30
[51] Int. Cl. .........................................................A61b 3/02
[58] Field of Search ............................................351/30–32; 350/188, 187, 3.5

[56] References Cited

UNITED STATES PATENTS

| | | | |
|---|---|---|---|
| 3,490,832 | 1/1970 | Mitsuishi et al. | 351/30 |
| 3,341,275 | 9/1967 | Haugen | 351/30 |
| 2,924,146 | 2/1960 | Back | 350/187 |
| 1,174,547 | 3/1916 | Clason | 351/30 |

OTHER PUBLICATIONS

Leith, Emmett et al., " Holographic Imagery Through Diffusing Media," JOSA, Vol. 56, No. 4, April 1966, p. 523.

*Primary Examiner*—David Schonberg
*Assistant Examiner*—Paul A. Sacher
*Attorney*—William C. Nealon, Noble S. Williams, Robert J. Bird and Bernard L. Sweeney

[57] ABSTRACT

An optical system for measuring the acuity of a low-vision patient has a variably magnified image of a reference character displayed on a rear vision screen. The image is effectively rotatable in order to provide the operator with a verification of the response of the patient.

5 Claims, 2 Drawing Figures

PATENTED FEB 1 1972   3,639,042

INVENTOR.
BERNARD GROLMAN
BY
AGENT

APPARATUS FOR MEASURING THE ACUITY OF LOW-VISION PATIENTS

BACKGROUND OF THE INVENTION

This invention is related to ophthalmic testing instruments and is more particularly concerned with improved apparatus for measuring the acuity of low-vision patients.

The accurate ascertainment of the acuity of low-vision patients is important for a number of reasons. Among these is the determination of the efficacy of optical appliances, such as eyeglasses, which may be prescribed for the patient. In other cases, the determination of the acuity of such a patient is necessary for satisfying the requirements for the condition of legal blindness. In each of the above cases, the accuracy and repeatability of the test results are extremely important.

According to current practices, the standard means of acquiring such a determination involves the use of a letter chart, generally of the Snellen type, which is mounted on a moveable stand. The chart is moved toward and away from the patient in order to vary the angular size of the target which is intercepted by the eye of the patient. In like manner, the chart may be fixed in position and the patient moved relative to the chart. Obviously, the accuracy and repeatability of measurements with such a system are necessarily low.

SUMMARY OF THE INVENTION

Accordingly, it is an object of the present invention to provide an optical system for accurately measuring the acuity of a low-vision patient.

Another object of the invention is to provide such a system in which a variably magnified image of a reference character is presented on a screen, the screen being fixed relative to the patient.

A further object of the invention is to provide such an apparatus in which a zoom lens system is utilized to provide the necessary variable magnification and in which the patient or the clinician is able to remotely control the magnification of the image displayed on the screen.

A still further object of the invention is to provide such an apparatus in which means are provided for accomplishing a direct readout of a patient's threshold level.

Briefly, the invention in its broadest aspect comprises apparatus for measuring the acuity of a low-vision patient. The apparatus includes a target having a reference character thereon, a rear vision screen, means for projecting variably magnified images of the character onto the rear vision screen, and means for controlling the magnification of the image.

Further objects, advantages, and features of the invention will be apparent in the arrangement and construction of the constituent parts, in detail, as set forth in the following specification taken together with the accompanying drawing.

DETAILED DESCRIPTION OF THE PREFERRED EMBODIMENTS

Figure 1:
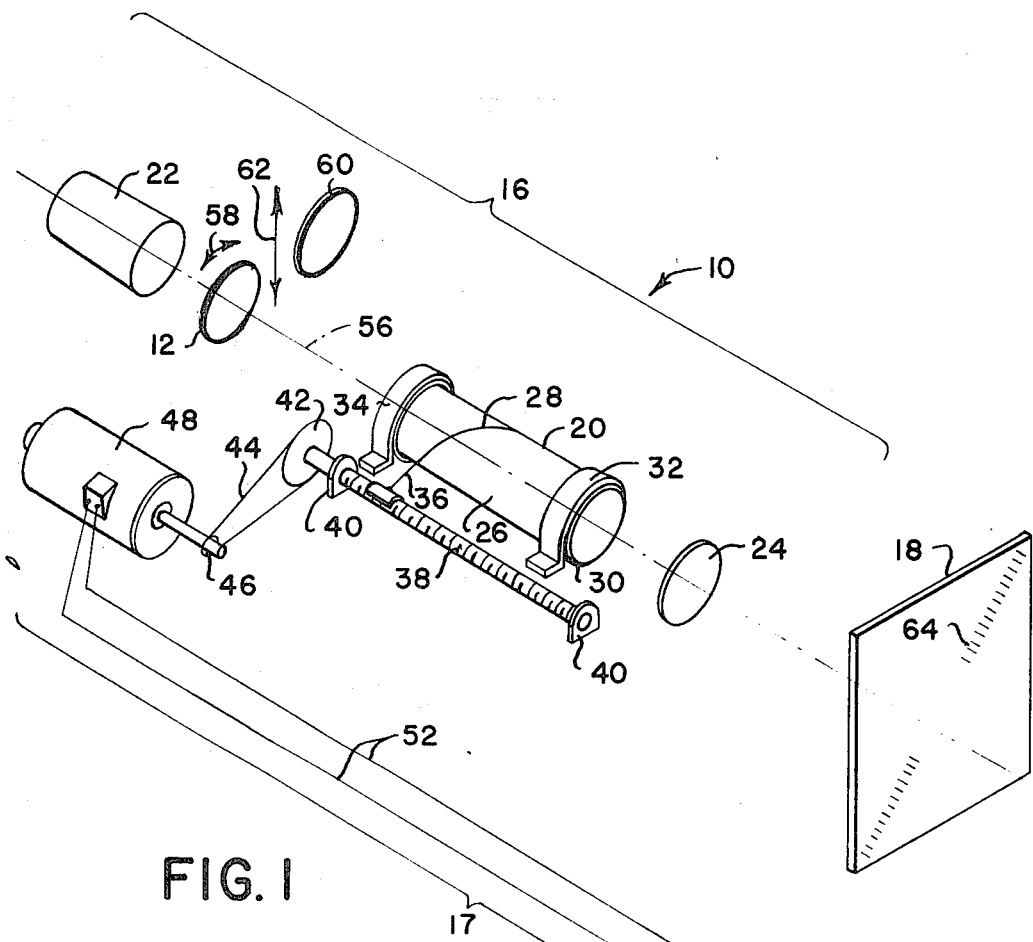
FIG. 1 is a schematic, isometric view of apparatus according to the invention.

Referring now to FIG. 1, there is shown apparatus 10 for measuring the acuity of a low-vision patient. The apparatus 10 is generally comprised of a target 12, a rear vision screen 18, a means 16 for projecting a variably magnified image of a reference character on the target 12 onto the rear vision screen 18, and a means 17 for controlling the magnification of the image. The means 16 for projecting a variably magnified image of the character onto the rear vision screen 18 includes, in this preferred embodiment, a zoom lens system 20, a projection lamp 22, and a projection lens 24. The projection system 16 provides an image of the character, on the target 12, on the rear of the screen 18. The patient, who is positioned in front of the screen 18, views the image presented thereon and informs the operator when he is able to recognize the character presented.

The zoom lens system 20 is comprised of a central rotatable sleeve 26, on which a cam groove 28 is formed, and a pair of annular end caps 30. The end caps are held fixed by a pair of brackets 32 and 34. The zoom lens system 20 includes an optical system such as is shown in U.S. Pat. No. 3,502,392 to Muller, which is also assigned to the assignee of the present application. The disclosure of this patent is incorporated herein by reference to show an example of a feasible zoom optical system for use in the present invention. The particular mechanical and optical components form no part of the present invention.

Means 17 is provided for adjusting the magnification of the image presented on the screen 18. For example, a cam follower 36, which engages the camming groove 28, is mounted on a lead screw 38 which is in turn journaled in a pair of bearing brackets 40. A pulley 42 is mounted on the end of the lead screw shaft and is connected by means of a belt 44 to the output shaft 46 of a reversible electric motor 48. The motor 48 is controllable by means of a rotary switch 50 which is connected to the motor by means of conductors 52. The switch 50 may be located such that either the clinician or the patient may operate the electromechanical means in order to vary the magnification of the image presented. This reversible rotation of the switch 50 is represented by the arrow 54. However, any other means of controlling the magnification is also included within the purview of the invention, e.g., manual rotation of the sleeve 26.

Figure 2:
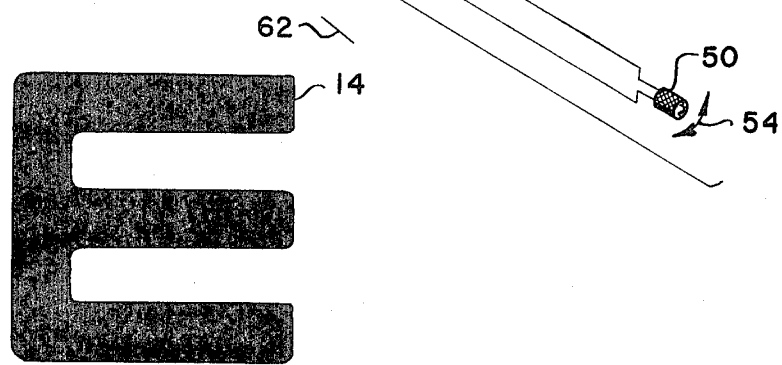
FIG. 2 is an enlarged showing of a preferred reference character for use with the apparatus of the invention.

A preferred reference character for incorporation in the target 12 is shown by the "illiterate E" 14 set forth in FIG. 2. A "Landolt ring" is also seen as a preferred reference character to allow the clinician to perform ophthalmic examinations on illiterate patients, such as children, as well as other individuals. Also, it is more difficult for a patient to falsify the test results by prior knowledge of the characters to be presented. The patient is presented with different sizes of the character in a number of different rotational orientations. In addition, the test results are more valid, as many patients are able to recognize letters by their general shape even though they cannot actually discern the character presented. With the aforementioned preferred reference characters, the general shape is always the same, i.e., a square or a circle, and the patient must be able to see the character quite clearly to ascertain the correct orientation.

The clinician may wish to verify the patient's response. This is accomplished by effectively rotating the reference character displayed on the target 12. The target 12 may be either rotated about the optical axis 56, as shown by the arrow 58, or different rotational orientations of the reference character may be present on a slide and sequentially inserted into the optical system in order to achieve effective rotation of the displayed image. In order that the patient is not provided any visual clues as to the direction of rotation of the target 12, it is desirable to provide a means for obscuring the target 12 during rotation. However, it is also desirable that the screen 18 remain lighted during this rotation such that the patient's eyes doe not have to readjust to a different light level both before and after the rotation. Such a function may be performed by inserting a diffuser 60 into the optical system between the target 12 and the screen 18. Preferably the diffuser is inserted immediately in front of the target 12 and is slidably mounted as shown by the arrow 62. When the diffuser is in place, the beam of light passing through the target 12 is sufficiently diffused such that a constant background illumination is maintained on the screen 18.

The total effective target size range may be integrally increased by supplying a set of reference characters on the target 12 which are related in size by the ratio of magnification of the zoom lens system 20. For example, if the zoom lens system 20 were to supply a magnification range of 8:1, a range of 64:1 may be achieved by providing two target sizes on a slide, the character sizes being also in an 8:1 ratio.

At a 15-foot viewing distance, the smaller target size would provide a Snellen threshold from 20/15 to 20/120 and the larger character size would cover the range from 20/120 to 20/1,000. It similarly follows that by working the patient at a 5-foot viewing distance, that the apparatus would afford a total acuity range of from 20/45 to 20/3,000. It is, however, quite likely that the majority of the acuity measurements would be accomplished while utilizing the larger size target almost exclusively.

A means is included in the preferred embodiment of the invention, shown in FIG. 1, for directly reading the threshold level of the patient. A reference mark is placed on the target 12 adjacent the reference character. This type of a mark is depicted by the mark 62 which is shown in FIG. 2. A set of graduated indicia 64 is emplaced on the screen 18. These may be a set of regularly spaced radial marks or a set of concentric circles depending on the type of target utilized. Therefore, when the patient acknowledges recognition of the image presented, the operator is able to ascertain immediately quantitatively the acuity of the patient. This is accomplished by noting the coincidence of the mark 62 on the graduated indicia 64, the distance the patient is positioned from the screen, and comparing a chart or nomogram. Alternatively, this function could be performed by many other means, for example by sensing the position of the cam follower, lead screw, zoom system barrel, or the control switch and providing a readout therefrom.

The normal operating procedure for measuring the acuity by means of the aforementioned apparatus is as follows. The practitioner selects the appropriate viewing distance and reference character size based on his experience and knowledge of the patient. If the patient's general condition is not known, the approach would be to start with the reference character presented at essentially the 20/15 position and the test conducted therefrom. In other words, the practitioner presents the acuity target to the patient at below the patient's threshold level. The size of the image is then gradually increased until the patient reports that he can see the image. In the above-described apparatus, the zoom optics being electrically driven may be operated by the patient such that the practitioner is merely monitoring the test at this time. The threshold may then be varied by requiring the patient to identify the meridianal rotation of the image presented on the screen 18. For refinement of the measurement, the image size may be reduced prior to each meridianal examination and the threshold measurement repeated. Obviously, in addition, the target's rotational flexibility may be also utilized where the correction of an astigmatic condition is appropriate. It is also foreseen, that for some patients the threshold measurements may need to be made at more than one viewing distance or at more than one target size.

The above system provides greater convenience for both the clinician and the patient and also affords far greater accuracy of measurement and repeatability. This is accomplished by providing consistency of target contrast, precise control and calibration of the target size, and the meridianal flexibility allowable in the frontal plane.

While there has been shown and described what is considered to be a preferred embodiment of the present invention, it will be obvious to those skilled in the art that various changes and modifications may be made therein without departing from the invention.

I claim:

1. Apparatus for measuring the acuity of a low-vision patient comprising
   an effectively rotatable target having a character thereon,
   a rear vision screen,
   means for projecting a variably magnified image of the character onto the rear vision screen,
   means for rendering the image unintelligible to the patient while the character is effectively rotated,
   means for controlling the magnification of the image whereby the acuity of the low-vision patient may be measured by enlarging the image until the patient is able to recognize the character presented.

2. Apparatus according to claim 1, wherein means are provided for retaining illumination of the screen while the character is effectively rotated.

3. Apparatus according to claim 2, in which the means for rendering the image unintelligible is a diffuser which is inserted between the target and the screen.

4. Apparatus according to claim 1, wherein the means for projecting includes a zoom lens system, the means for controlling comprises electromechanical means connected to the zoom lens system for driving the zoom lens system between its limits of magnification and a switch which is operable by the patient for actuating the electromechanical means, and the target includes a plurality of interchangeable characters thereon, the characters being related in size by the ratio of magnification of the zoom lens system to integrally increase the range of continuous magnification.

5. Apparatus according to claim 1, wherein the target includes a radially disposed reference mark and the screen includes a set of graduated indicia for directly reading the threshold level of a patient.

* * * * *